Figure 4:
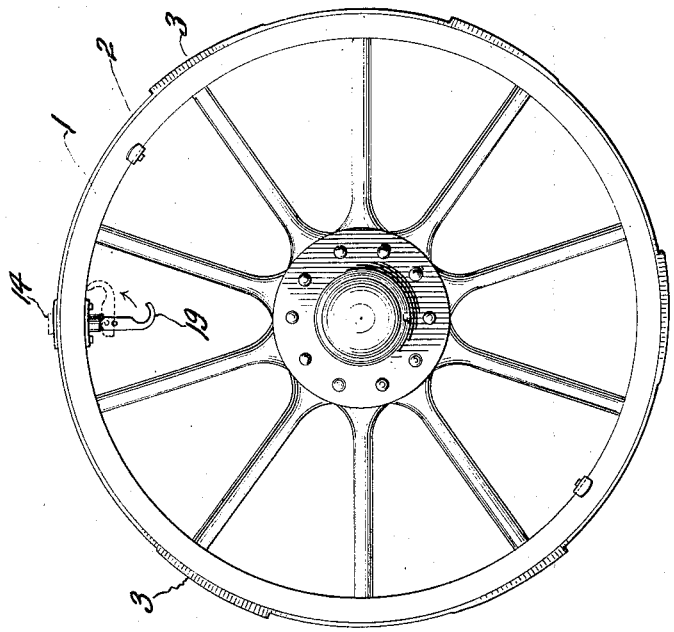

A. DOW.
DEMOUNTABLE TIRE RIM.
APPLICATION FILED DEC. 30, 1908.
922,402.
Patented May 18, 1909.
6 SHEETS—SHEET 1.
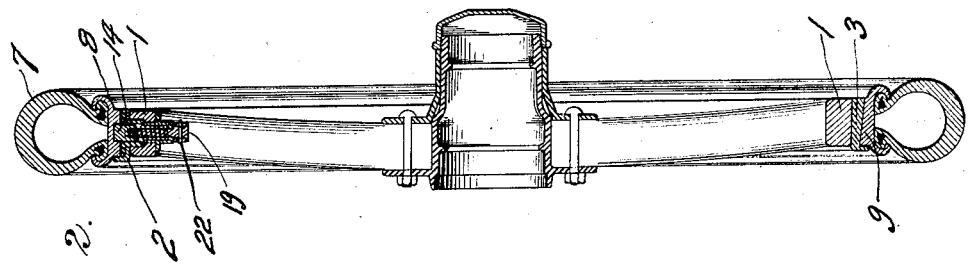
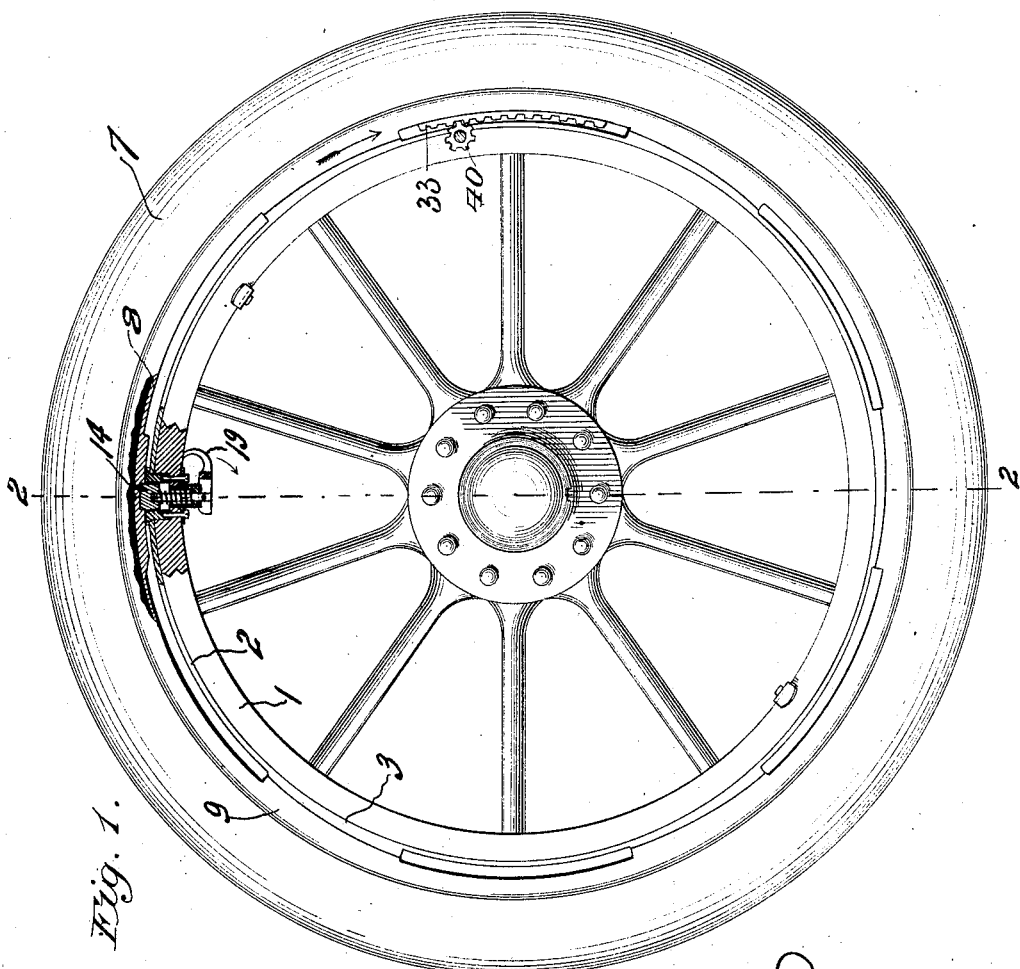
Witnesses:
Edward G. Rowland.
Chas. W. Edwards.
Alexander Dow, Inventor
By his Attorney
Stewart & Stewart

A. DOW.
DEMOUNTABLE TIRE RIM.
APPLICATION FILED DEC. 30, 1908.

922,402.

Patented May 18, 1909.
6 SHEETS—SHEET 2.

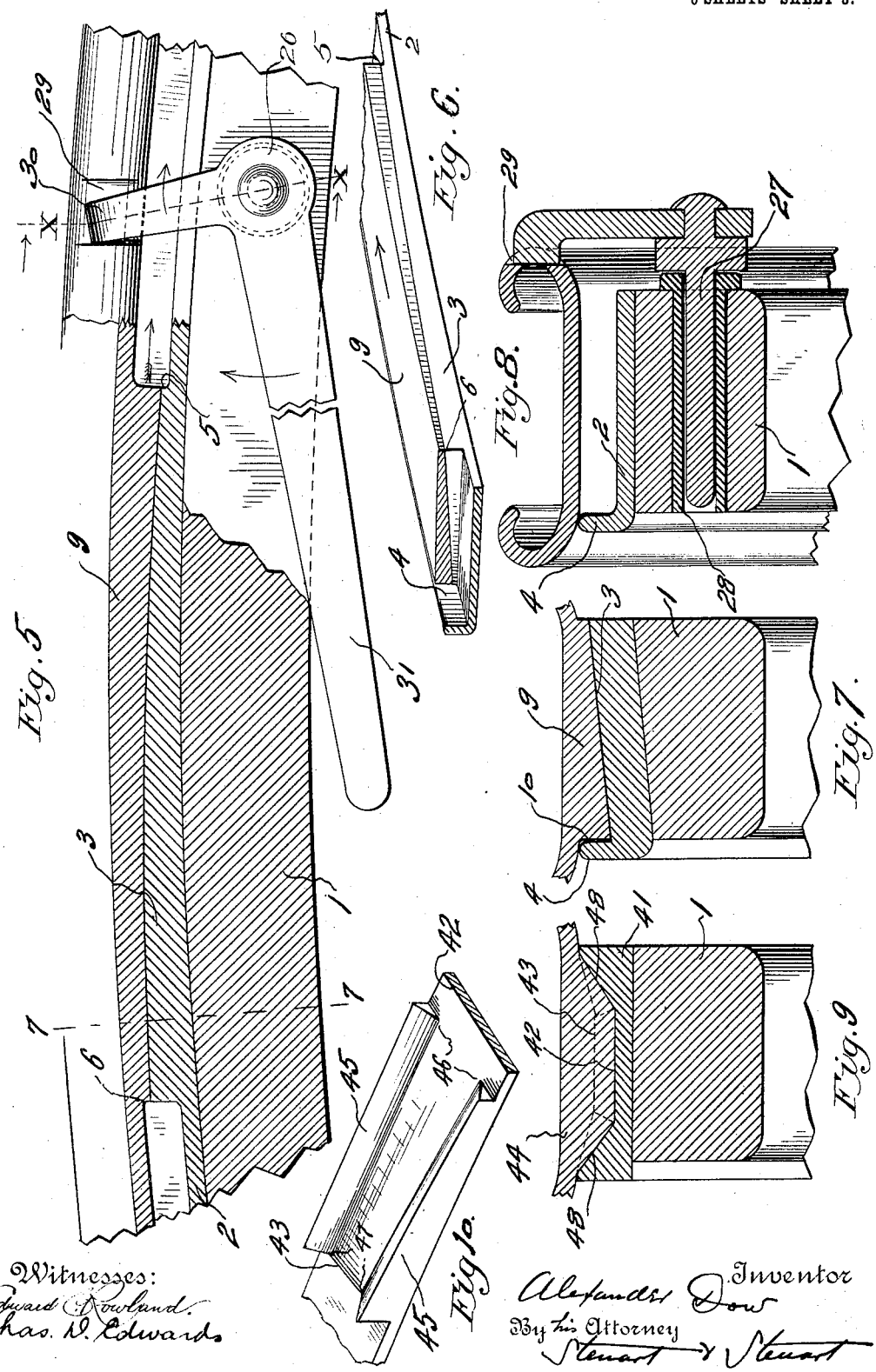

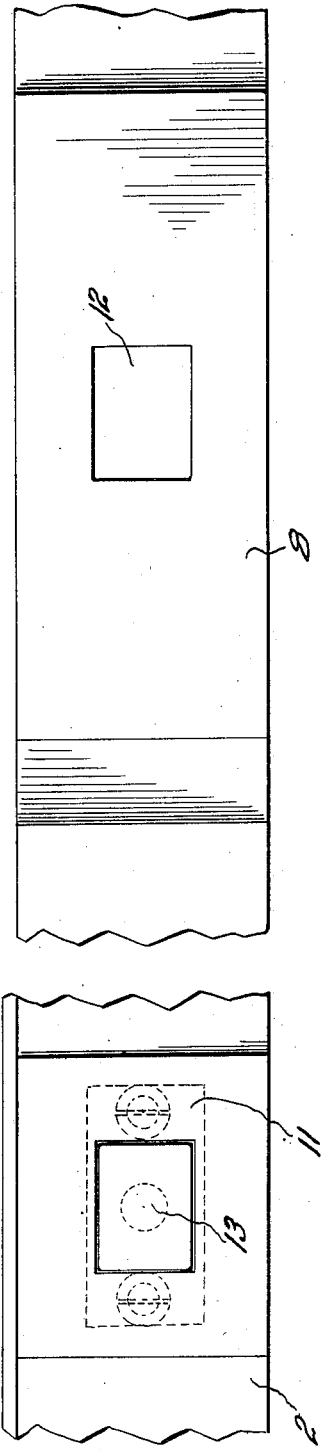
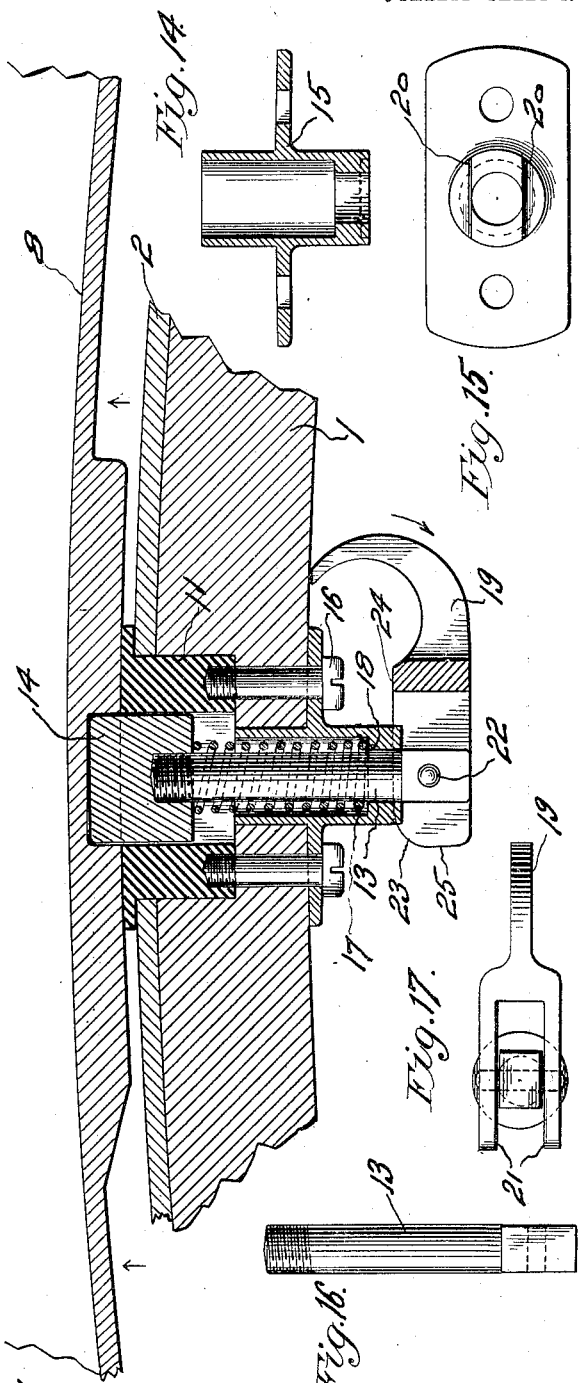

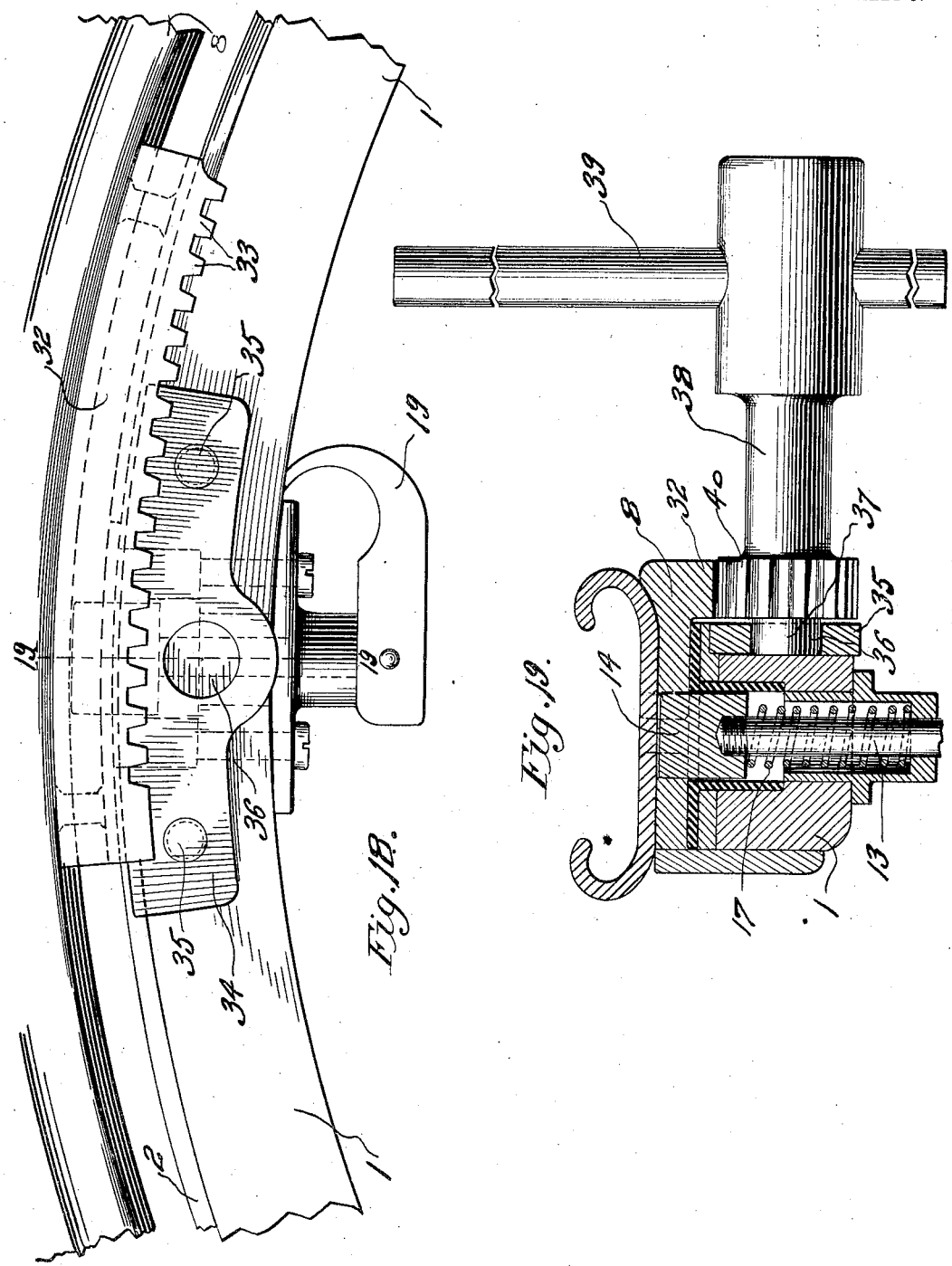

A. DOW.
DEMOUNTABLE TIRE RIM.
APPLICATION FILED DEC. 30, 1908.

922,402.

Patented May 18, 1909.
6 SHEETS—SHEET 6.

UNITED STATES PATENT OFFICE.

ALEXANDER DOW, OF NEW YORK, N. Y., ASSIGNOR TO DOW RIM COMPANY, A CORPORATION OF NEW YORK.

DEMOUNTABLE TIRE-RIM.

No. 922,402.   Specification of Letters Patent.   Patented May 18, 1909.

Application filed December 30, 1908. Serial No. 470,052.

*To all whom it may concern:*

Be it known that I, ALEXANDER DOW, a citizen of the United States of America, residing at New York city, in the county and State of New York, have invented certain new and useful Improvements in Demountable Tire-Rims, of which the following is a specification.

My invention relates to an improvement in demountable tire rims for automobiles and the like.

The object of the invention is to construct the demountable tire and wheel rims in such fashion that upon proper relative movement of the two, the same are securely locked against both lateral and circumferential displacements without the use of bolts, clamps or other additional locking devices.

Heretofore the demountable tire rim or wheel rim or both have ordinarily been provided with flanges adapted to be engaged by a lateral movement of the tire rim over the wheel rim, after which certain bolts or clamps have been utilized to prevent lateral and other displacement of the tire rim. These movable bolts or clamps have necessarily been individual devices disposed at intervals around the wheel, each requiring separate attention, and thereby involving a loss of much valuable time in placing and removing the tire. Furthermore, such locking devices or clamps being generally held in position by screws or bolts were not necessarily securely held, and could, therefore, become loosened in consequence of the vibration of the wheels of the vehicle when in use. In my invention on the other hand all the locking devices are in effect integral with the demountable tire and felly rims and are brought into interlocking engagement simultaneously by a single movement of the tire rim on the felly.

My invention also comprises means whereby upon a proper relative movement of the tire and wheel rims to interlocking position, the final locking is automatic. The interlocking devices of my invention consist of coöperating wedge shaped surfaces on both elements locking the same and preventing both lateral and circumferential displacement.

My invention also comprises means for moving the rims with their wedges over each other with great force to bring the parts to locking position. Once in proper position, a single automatic spring bolt operates to prevent any return movement of the tire rim on the wheel rim. This bolt has the further function of relieving the wedges of a large part of the strains due to the driving action of the wheels.

These and other objects of the invention will more fully hereinafter appear in connection with the accompanying drawings.

Figure 3:
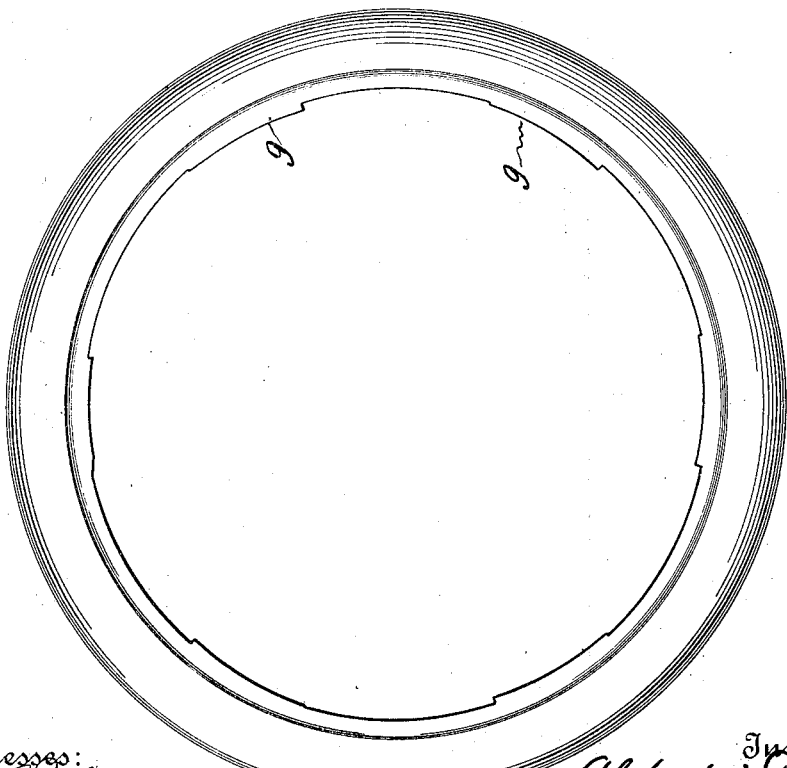
Figure 20:
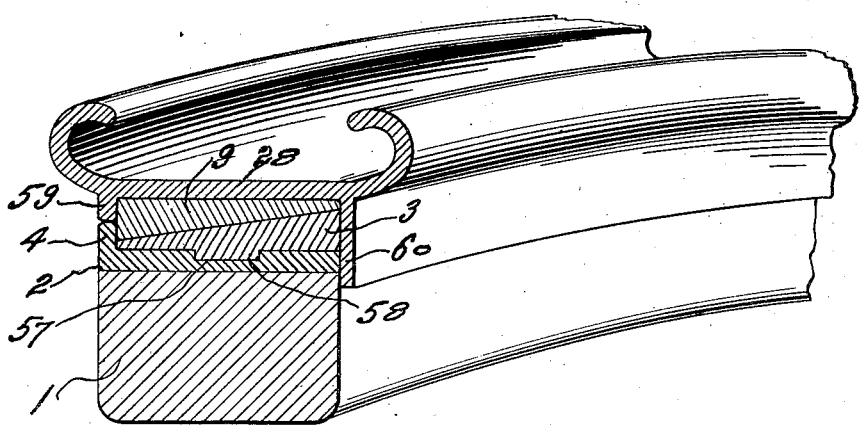
Figure 21:
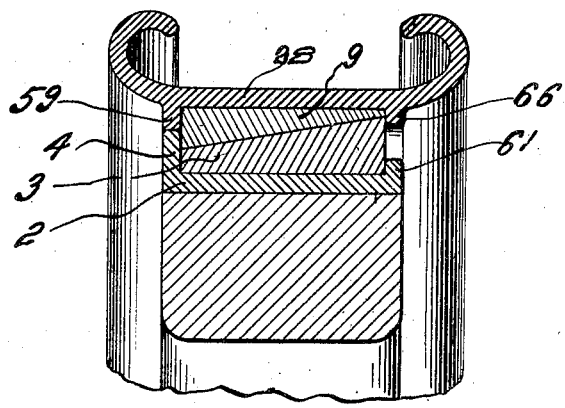

Figure 1 is a view in side elevation of the wheel with the demountable rim and tire assembled thereon. Fig. 2 is a view on the line 2—2 of Fig. 1. Fig. 3 is a view in side elevation of the demountable rim and tire thereon showing the locking devices carried by the demountable rim. Fig. 4 is a view in side elevation of the wheel showing the locking devices carried by the rim on the felly thereof. Fig. 5 is a detail view partly in broken cross-section and partly in elevation, showing the demountable rim in locked position on the felly and showing also a device for moving the rim into and out of locking position. Fig. 6 is a detail view in perspective showing the locking wedges of the demountable rim and wheel in locked position. Fig. 7 is a detail view in cross-section through the demountable rim and wheel felly on the line 7—7 of Fig. 5. Fig. 8 is a view in cross-section on the line $x$—$x$ of Fig. 5. Fig. 9 is a view similar to Fig. 7 in cross-section through a modified form of demountable rim and wheel felly in locked position. Fig. 10 is a detail perspective view showing the locking wedges on the wheel felly rim of Fig. 9. Fig. 11 is a view in enlarged detail taken in cross-section through the devices shown in Figs. 1 and 2 for locking the demountable rim in position on the wheel. Fig. 12 is a detail top plan view of the locking device shown in Fig. 11, the demountable rim being removed. Fig. 13 is a bottom plan view of the section of the demountable rim shown in Fig. 11. Fig. 14 is a detail view in cross-sectional elevation of the cup or casing carrying the locking pin and spring shown in Fig. 11. Fig. 15 is a bottom plan view of the device shown in Fig. 14. Fig. 16 is a locking pin shown in Fig. 11. Fig. 17 is a bottom plan view of the locking pin and finger lever for operating the same. Fig. 18 is an enlarged detail view in cross-sectional elevation of a modified form of device for moving the demountable rim into and out of locking position on the wheel felly. Fig. 19 is a view in cross-section on the line 19—19 of Fig. 18, the operating handle being also shown. Fig. 20 is a detail view in perspective of the interlocking portions of a modified form of the invention. Fig. 21 is a detail view in cross-section of the interlocking portions of yet another modification of the invention.

Referring to the drawings, the wheel felly 1 is shown provided with a metal rim 2. Spaced equidistantly around the periphery of the rim 2 and preferably integral therewith are wedges 3. These wedges are tapered in two directions. They taper upward from the base of a flange 4 at the inner side of the rim 2 and outward to the outer face of the rim and felly. They also taper from a point 5 (see Fig. 5) at the right-hand end of the wedge upward on a curve which is slightly spiral to a point 6 at the left-hand end of the wedge. The double wedge shape is best shown in Fig. 6.

The tire 7 (see Figs. 1, 2 and 3) carries a metal rim 8. Spaced equidistantly around the rim 8 and preferably integral therewith are a series of wedges or locking devices 9. The wedges 9 like the wedges 3 on the felly have a double taper, the tapers of the wedge 9, as shown in Figs. 5, 6 and 7 being exactly converse to the tapers of the wedge 3. The distances between successive wedges 3 on the wheel are greater than the length of the wedges 9 so that the latter may be pushed over the felly rim 2 between the wedges 3 when the tire is to be placed upon the wheel or be removed therefrom.

The demountable rim with the tire thereon having been placed on the wheel by passing the wedges 9 laterally over the rim 2 between the wedges 3 of the latter, the wheel and tire are then securely locked together by a relative circumferential movement of the same. By suitable means presently to be described, the long tapered surface of the wedge 9 of the tire between the points 5 and 6 (see Fig. 5) is forced over the corresponding surface of the wedge 3 until the ends 5 and 6 of the two wedges register as shown in Figs. 5 and 6, at which time the engagement of the two surfaces prevents relative movement of the two parts in that direction. During the above movement the laterally tapered surfaces of the two wedges (see Fig. 7) have by engagement one with the other caused the shoulder 10 on the wedge 9 to be forced against the inner face of the flange 4 of the wedge 3. The flange 4 then prevents the demountable rim from passing backward off the wheel, while the upward taper of the wedge 3 prevents the demountable rim from being moved outward laterally and off the wheel. The demountable rim is then locked against lateral movement in both directions and against circumferential movement in one direction, and it only remains to lock it against circumferential movement in the direction of the arrow of Fig. 5 to secure it absolutely against displacement. The device for thus locking the demountable rim and tire is shown in Figs. 1 and 2, and more particularly in Fig. 11. In Fig. 11, the demountable rim 8 is shown as locked to the wheel felly 1. Carried in a counter-sink or hole in the wheel felly is a hollow member or sleeve 11, the inside of which is of rectangular shape as shown in Fig. 12. In the inner surface of the demountable tire rim is a counter-sink or hole 12 of the same size and shape as the hole in the member 11, which is adapted to register with the hole in the member 11 when the parts are in the locked position shown in Figs. 1 and 5. Carried within the opening in the member 11 on a pin 13 is a bolt 14. The pin 13 is carried in a hollow casing or member 15 which projects from the inner periphery of the felly therethrough into the opening in the member 11 and which is secured to the felly and to the member 11 by means of bolts 16 as shown in Fig. 11. A spiral spring 17 embracing the pin 13 and bearing at one end against an inner shoulder 18 in the member 15 and at the other end against the bolt 14 tends normally to throw the bolt 14 outward into the position shown in Fig. 11. To operate the bolt 14, there is hinged thereto a finger lever 19. This lever when in the position shown in Fig. 11 is prevented from turning around the pin 13 as an axis by reason of the shoulders 20 (see Fig. 15), on the end of the member 15, which engage the arms of the fork 21 carrying the finger lever. The bolt is withdrawn against the action of the spring 13 by turning the finger lever down from the position shown in Fig. 11 in the direction of the arrow around the pin 22 as an axis. In order that the bolt 13 may be withdrawn by this movement of the lever 19, the arms of the fork 21 are cam-shaped as shown at 23, the surface 24 being nearer the pin 22 than the surface 25. When the lever 19 is at right-angles to the position shown in Fig. 11, the surfaces 25 rest upon the end of the member 15 and the bolt is withdrawn from the hole 12 in the demountable rim 8. The pressure of the spring 18 holds the lever 19 firmly in either of its two positions. The bolt 14 is so shaped and designed that it is capable of sustaining the driving pressure exerted upon it by the demountable tire rim 8. It will be noted that the wedges are so shaped that the pressure exerted by the driving action of the wheels is received by the bolt 14, and not by the long taper of the wedge shown in Fig. 5. Were it otherwise, the wedges shown in Fig. 5 might be jammed by the driving action of the wheel so as to render the removal of the demountable tire rim difficult, and, furthermore, the demountable tire rim might become slightly displaced upon the wheel in either direction.

In Figs. 5 and 8, and 18 and 19, are shown two different forms of devices for moving the demountable tire rim into position upon the wheel felly. The device for effecting this movement as shown in Figs. 5 and 8, is a two-armed or bell crank lever 26, carrying at the elbow thereof a bearing pin 27. Mounted at a suitable point in the wheel felly is a hollow bushing or bearing 28 into which the bearing pin 27 loosely fits so as to be readily inserted or removed. In the edge of the demountable tire rim, as at 29 (see Figs. 5 and 8) is a slot or groove adapted to receive the end of the arm 30 of the bell crank lever 26. After the demountable tire has been forced laterally on to the wheel, bearing pin 27 is inserted into the bushing 28 and the end of the arm 30 into the slot 29. The arm 31 of the lever 26 is then forced downward and the arm 30 engaging the demountable tire rim forces the wedge 9 of the latter over the wedge 3 of the former to the position shown in Fig. 5. The lever 26 is then removed from the wheel. In removing the demountable tire rim the lever 26 is then placed in the wheel and the arm 31 forced up. The movement of the lever need not be great, as ordinarily all but a short part of the movement of the parts may be effected by hand.

In Figs. 18 and 19, a somewhat different form of device for moving the demountable tire rim into position is shown. In the structure shown in this figure, the demountable tire rim 8 carries a depending flange 32 in the lower edge of which a series of teeth 33 are cut to form a segment of an internal gear or rack. To the side of the felly of the wheel, a plate 34 is attached as by means of bolts 35. The plate 34 has a hole 36 at its center, which serves as a bearing for the end 37 of a shaft 38, carrying at its outer end the handle 39. At its inner end near the plate 34 the shaft 38 carries a pinion 40, which when the end 37 of the shaft is inserted in the hole 36 of the plate, meshes with the rack or gear 32. In operation the demountable tire rim having been forced laterally on to the wheel and having been moved by hand as far as possible circumferentially, the shaft 38 is inserted in its bearing with the teeth of the pinion 40 engaging the teeth of the rack 32, and the handle 39 is then turned as far as necessary to force the wedge 9 over the wedge 3. In removing the demountable tire rim, the operation is just the reverse. The locking bolt 14 is automatic in its action, snapping into the recess 12 in the demountable tire rim as soon as that recess registers with the bolt.

In Figs. 9 and 10, I have shown a modified form of wedge or locking device. Here, as in Figs. 5 and 6, there is a double wedge action. The wedges 41 carried by the wheel, taper from a point 42 at one end thereof outward radially to the point 43 at the other end, and the wedges 44 on the demountable tire rim have a taper converse to the taper on the wedges 41. In addition to the wedge action denoted by the taper between the lines 42 and 43 (see Fig. 9) there is another wedge action. In this modification instead of a flange 4 at one side of the wheel felly and the lateral taper therefrom, as in Fig. 7, there are two flanges or sloping surfaces 45, one on either side of the felly rim as shown in Fig. 10. The distance between these members 45 at the points 46 thereof is greater than the distance between the same at the points 47 thereof. The demountable tire rim (see Fig. 9) is tapered laterally at either side 48 thereof conversely to the taper of the elements 45 on the wheel rim. As in the case of the structure shown in Figs. 5 and 6, the demountable tire rim is first forced laterally on the wheel rim and the wedges then brought into engagement by a relative circumferential movement. During this movement, the bottom face of the wedge of the demountable tire rim is brought into engagement with the central face of the wedge of the wheel rim, and the side tapers of the two wedges are likewise brought into contact so that lateral displacement as well as forward movement are finally prevented when the locking bolt snaps into position.

In the forms of the apparatus heretofore described, the wedges have been shown integral with the tire and wheel rims. Instead, however, of having the wedges thus integral with the rims, they may be made separable therefrom, and in Figs. 20 and 21, I have shown the wedges so made. In Fig. 20, the felly rim 2 is shown as provided with the usual inner flange 4. Positioned centrally of the felly rim are a series of recesses or slots 57 corresponding in number to the number of the wedges or one continuous slot. The wedges 3 of the wheel rim which are of the style shown in Fig. 5, are each provided on their under surface with a depending projection 58 adapted to fit into the recess 57 in the wheel rim and to be held thereby against lateral displacement during the locking movements of the parts. The demountable tire rim 8 is provided with a depending flange 59 adapted to engage each of the wedges 9 of the demountable tire rim on the inner side, and is provided on the outer side with a long depending flange 60, which has the double function of engaging and confining the wedges 9 on that side of the wheel and of preventing access of mud and dust to the wedges. The wedges thus held by the flanges and projections noted act when the parts are moved precisely as if integral to the respective rims.

In the form of the invention shown in

Fig. 21, the wheel rim 2 in addition to the flange 4 on the inner side is provided with a flange 61 on the outer side thereof, between which flanges the wedges 3 are securely held. The demountable tire rim 28 is constructed as in Fig. 20, except that the flange 66 on the outside face thereof projects but a short distance below the outer surface of wedge 9.

What I claim is:

1. In combination, a fixed felly rim and a demountable rim carrying the tire, wedges on the fixed rim and on the demountable rim adapted to be brought into engagement with each other by a relative circumferential movement of the rims, the opposing surface of the wedges having a general incline along the circumference of the wheel from a longer to a shorter wheel radius, and having also an incline transverse to the circumference and means for locking the demountable rim to the fixed rim when the opposing wedges are in proper engagement.

2. In combination, a fixed felly rim and a demountable rim carrying the tire, wedges on the fixed rim and on the demountable rim adapted to be brought into engagement with each other by a relative circumferential movement of the rims, the opposing surfaces of the wedges having a general incline along the circumference of the wheel from a longer to a shorter wheel radius, and having also an incline transverse to the circumference from a longer to a shorter wheel radius, means for locking the demountable rim to the fixed rim when the opposing wedges are in proper engagement, and means whereby a leverage may be exerted on the two rims to move one circumferentially over the other.

3. In combination, a fixed felly rim and a demountable rim carrying the tire, wedges on the fixed rim and on the demountable rim adapted to be brought into engagement with each other by a relative circumferential movement of the rims, the opposing surfaces of the wedges having a general incline along the circumference of the wheel from a longer to a shorter wheel radius, and having also an incline transverse to the circumference, means for locking the demountable rim to the fixed rim when the opposing wedges are in proper engagement, and a rack or segmental gear carried by one of the rims engaging a pinion carried by the other rim, whereby upon rotation of the pinion one rim is moved circumferentially over the other.

4. In combination, a fixed felly rim and a demountable rim carrying the tire, wedges on the fixed rim and on the demountable rim adapted to be brought into engagement with each other by a relative circumferential movement of the rims, the opposing surfaces of the wedges having a general incline along the circumference of the wheel from a longer to a shorter wheel radius, and having also an incline transverse to the circumference from a longer to a shorter wheel radius, and means acting automatically to lock the demountable rim to the fixed rim when the opposing wedges are in proper engagement.

5. In combination, a fixed felly rim and a demountable rim carrying a tire, a vertical flange on the periphery of the fixed rim near the inside face thereof, wedges on the fixed rim and on the demountable rim adapted to be brought into engagement with each other by a relative circumferential movement of the two rims, the opposing surfaces of the wedges having a general incline along the circumference of the wheel from a longer to a shorter wheel radius, and being also inclined transversely to the circumference from a longer wheel radius toward the outside surface of the wheel to a shorter wheel radius toward the flange, and means for locking the demountable rim to the fixed rim when the opposing wedges are in proper engagement.

6. In combination, the fixed felly rim and a demountable rim carrying a tire, wedges on the fixed rim and on the demountable rim adapted to be brought into engagement with each other by a relative circumferential movement of the two rims, the opposing faces of the two wedges being approximately of spiral contour when viewed from the side of the wheel, and being also laterally inclined from a longer wheel radius toward one face of the wheel to a shorter wheel radius toward the other face of the wheel.

7. In combination, a fixed felly rim and a demountable rim carrying a tire, wedges on the fixed rim and on the demountable rim adapted to be brought into engagement with each other by relative circumferential movement of the two rims, a rack carried by one of the rims and a removable pinion forming part of a tool for engaging the rack to move the rack with the demountable rim over the fixed rim when the pinion is rotated.

Signed by me at New York city, county and State of New York, this 29th day of December, 1908.

ALEXANDER DOW.

Witnesses:
WILLIAM H. HEAGERTY,
CHARLES D. EDWARDS.